United States Patent
Saito

(10) Patent No.: US 9,554,409 B2
(45) Date of Patent: Jan. 24, 2017

(54) COMMUNICATION TERMINAL APPARATUS, COMMUNICATION CONTROL SYSTEM, AND COMMUNICATION CONTROL METHOD

(71) Applicant: FUJITSU LIMITED, Kawasaki-shi, Kanagawa (JP)

(72) Inventor: Naritoshi Saito, Hino (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/479,038

(22) Filed: Sep. 5, 2014

(65) Prior Publication Data

US 2015/0117359 A1 Apr. 30, 2015

(30) Foreign Application Priority Data

Oct. 24, 2013 (JP) ................................. 2013-221493

(51) Int. Cl.
*H04W 76/02* (2009.01)
*H04W 72/02* (2009.01)

(52) U.S. Cl.
CPC ........... *H04W 76/023* (2013.01); *H04W 72/02* (2013.01)

(58) Field of Classification Search
CPC ...... H04W 4/005; H04W 8/005; H04W 28/12; H04W 48/12; H04W 52/0216; H04W 72/02; H04W 72/04; H04W 72/042; H04W 72/0446; H04W 72/085; H04W 72/1242; H04W 76/023; H04W 76/043; H04W 72/1289; H04W 92/18; H04L 5/003; H04L 5/0058; H04B 17/382; H04B 7/2656

See application file for complete search history.

(56) References Cited

U.S. PATENT DOCUMENTS

| | | | | |
|---|---|---|---|---|
| 9,036,532 | B2* | 5/2015 | Lim | H04W 4/08 370/312 |
| 9,185,690 | B2* | 11/2015 | Khoshnevis | H04W 72/042 |
| 2008/0019315 | A1 | 1/2008 | Machida | |
| 2011/0255450 | A1* | 10/2011 | Wang | H04W 72/0493 370/280 |
| 2012/0129540 | A1* | 5/2012 | Hakola | H04W 72/042 455/450 |
| 2013/0142268 | A1* | 6/2013 | Gao | H04W 72/04 375/252 |
| 2013/0188546 | A1* | 7/2013 | Turtinen | H04W 8/005 370/312 |

(Continued)

FOREIGN PATENT DOCUMENTS

| JP | 2008-028445 A | 2/2008 |
|---|---|---|
| JP | 2012-244424 A | 12/2012 |

*Primary Examiner* — Michael Thier
*Assistant Examiner* — Eric Nowlin
(74) *Attorney, Agent, or Firm* — Maschoff Brennan

(57) ABSTRACT

A communication terminal apparatus includes: an assigning part configured to assign a usage right of a first subframe, from among a plurality of subframes included in a frame, to a base station, in a case where terminal-to-terminal communication is performed by transmission and reception of the frame directly with a different communication terminal apparatus, based on frequency information reported from the base station; and an acquiring part configured to acquire, during the terminal-to-terminal communication, information from the base station from the first subframe.

16 Claims, 10 Drawing Sheets

(56) References Cited

U.S. PATENT DOCUMENTS

| | | | |
|---|---|---|---|
| 2013/0230026 A1* | 9/2013 | Kwon | H04W 76/023 370/336 |
| 2013/0322388 A1* | 12/2013 | Ahn | H04W 76/023 370/329 |
| 2014/0003262 A1* | 1/2014 | He | H04W 28/08 370/252 |
| 2014/0003301 A1* | 1/2014 | Madan | H04W 72/042 370/280 |
| 2014/0004867 A1* | 1/2014 | Noh | H04W 76/023 455/450 |
| 2014/0010099 A1* | 1/2014 | Chiu | H04W 72/085 370/252 |
| 2014/0269338 A1* | 9/2014 | Jung | H04L 5/0055 370/241 |
| 2014/0334354 A1* | 11/2014 | Sartori | H04W 8/005 370/280 |
| 2014/0341092 A1* | 11/2014 | Chu | H04L 5/1469 370/280 |
| 2014/0376458 A1* | 12/2014 | Ryu | H04W 72/085 370/329 |
| 2014/0376489 A1* | 12/2014 | Lee | H04L 5/0055 370/329 |
| 2015/0004901 A1* | 1/2015 | Agiwal | H04W 76/021 455/39 |
| 2015/0009910 A1* | 1/2015 | Ryu | H04W 72/04 370/329 |
| 2015/0016428 A1* | 1/2015 | Narasimha | H04L 5/0058 370/336 |
| 2015/0043398 A1* | 2/2015 | Fwu | H04L 5/0058 370/280 |
| 2015/0049732 A1* | 2/2015 | Xue | H04L 1/1854 370/330 |
| 2015/0055579 A1* | 2/2015 | Wu | H04L 1/1867 370/329 |
| 2015/0071212 A1* | 3/2015 | Kim | H04W 72/042 370/329 |
| 2015/0098416 A1* | 4/2015 | Kuo | H04W 72/10 370/329 |
| 2015/0098422 A1* | 4/2015 | Sartori | H04W 72/1242 370/329 |
| 2015/0131566 A1* | 5/2015 | Seo | H04B 1/3838 370/329 |
| 2015/0146647 A1* | 5/2015 | Chatterjee | H04L 5/0032 370/329 |
| 2015/0163790 A1* | 6/2015 | Lee | H04L 1/0025 370/329 |
| 2015/0180631 A1* | 6/2015 | Zhang | H04W 72/02 370/329 |
| 2015/0201401 A1* | 7/2015 | Lahetkangas | H04L 1/0079 370/329 |
| 2015/0208384 A1* | 7/2015 | Baghel | H04W 72/04 455/450 |
| 2015/0257184 A1* | 9/2015 | Yamazaki | H04W 76/023 370/329 |
| 2015/0270939 A1* | 9/2015 | Ro | H04L 5/0051 370/329 |
| 2015/0271862 A1* | 9/2015 | Lee | H04W 76/023 370/278 |
| 2015/0282132 A1* | 10/2015 | Kim | H04W 8/005 370/329 |
| 2015/0288508 A1* | 10/2015 | Wilhelmsson | H04W 76/023 370/280 |
| 2015/0327048 A1* | 11/2015 | Lee | H04W 8/005 370/329 |
| 2015/0365942 A1* | 12/2015 | Niu | H04W 48/14 370/330 |
| 2015/0382389 A1* | 12/2015 | Seo | H04W 8/005 370/280 |
| 2016/0007269 A1* | 1/2016 | Chae | H04L 5/0048 370/330 |
| 2016/0037551 A1* | 2/2016 | Lei | H04W 72/1273 370/280 |
| 2016/0043853 A1* | 2/2016 | Lin | H04L 5/0055 370/280 |
| 2016/0044694 A1* | 2/2016 | Park | H04W 72/10 370/329 |
| 2016/0044704 A1* | 2/2016 | Li | H04W 76/00 370/330 |
| 2016/0066317 A1* | 3/2016 | Chae | H04J 1/02 370/336 |
| 2016/0073392 A1* | 3/2016 | Byun | H04W 72/048 370/280 |
| 2016/0095092 A1* | 3/2016 | Khoryaev | H04W 8/005 370/329 |
| 2016/0105878 A1* | 4/2016 | Zhao | H04L 1/1887 370/329 |
| 2016/0119083 A1* | 4/2016 | Zhao | H04L 1/0068 375/267 |
| 2016/0119921 A1* | 4/2016 | Ma | H04W 48/00 370/280 |
| 2016/0135157 A1* | 5/2016 | Takano | H04W 16/06 370/330 |

* cited by examiner

FIG. 3

| CONFIGURATION NUMBER | SWITCHING POINT PERIOD | SUBFRAME NUMBER ||||||||||
|---|---|---|---|---|---|---|---|---|---|---|---|
| | | 0 | 1 | 2 | 3 | 4 | 5 | 6 | 7 | 8 | 9 |
| 0 | 5ms | D | S | U1 | U1 | U1 | U2 | S | U1 | U1 | U1 |
| 1 | 5ms | D | S | U1 | U1 | U2 | U2 | S | U1 | U1 | U2 |
| 2 | 5ms | D | S | U1 | U2 | U2 | U2 | S | U1 | U2 | U2 |
| 3 | 10ms | D | S | U1 | U1 | U1 | U2 | U2 | U2 | U2 | U2 |
| 4 | 10ms | D | S | U1 | U1 | U2 | U2 | U2 | U2 | U2 | U2 |
| 5 | 10ms | D | S | U1 | U2 | U2 | U2 | U2 | U2 | U2 | U2 |
| 6 | 5ms | D | S | U1 | U1 | U1 | U2 | S | U1 | U1 | U2 |

FIG. 9

| CONFIGURATION NUMBER | SWITCHING POINT PERIOD | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 7 | 5ms | D | S | U1 | U1 | U1 | D | S | U1 | U1 | U1 |
| 8 | 5ms | D | S | U1 | U1 | U2 | D | S | U1 | U1 | U2 |
| 9 | 5ms | D | S | U1 | U2 | U2 | D | S | U1 | U2 | U2 |
| 10 | 10ms | D | S | U1 | U1 | U1 | D | U2 | U2 | U2 | U2 |
| 11 | 10ms | D | S | U1 | U1 | U2 | D | U2 | U2 | U2 | U2 |
| 12 | 10ms | D | S | U1 | U2 | U2 | D | U2 | U2 | U2 | U2 |
| 13 | 5ms | D | S | U1 | U1 | U1 | D | S | U1 | U1 | U2 |

COMMUNICATION TERMINAL APPARATUS, COMMUNICATION CONTROL SYSTEM, AND COMMUNICATION CONTROL METHOD

CROSS-REFERENCE TO RELATED APPLICATION

This application is based upon and claims the benefit of priority of the prior Japanese Patent Application No. 2013-221493, filed on Oct. 24, 2013, the entire contents of which are incorporated herein by reference.

FIELD

The embodiments discussed herein are related to a communication terminal apparatus and the like.

BACKGROUND

In Long Term Evolution (LTE)-Advanced, device-to-device (D2D) wireless communication is performed. In the D2D wireless communication, communication of frames is performed directly between communication terminal apparatuses without through an LTE network. Therefore, system capacity for other users is improved by LTE-Advanced carriers.

For users that are using the D2D wireless communication, transmission and reception of frames is preformed directly between communication terminal apparatuses, thus causing less delay. Transmission and reception of data is performed at a maximum speed at which processing may be performed between the communication terminal apparatuses.

Japanese Laid-open Patent Publication No. 2012-244424 or 2008-28445, or U.S. Laid-open Patent Publication No. 2008/0019315 discloses a related art.

SUMMARY

According to an aspect of the invention, a communication terminal apparatus includes: an assigning part configured to assign a usage right of a first subframe, from among a plurality of subframes included in a frame, to a base station, in a case where terminal-to-terminal communication is performed by transmission and reception of the frame directly with a different communication terminal apparatus, based on frequency information reported from the base station; and an acquiring part configured to acquire, during the terminal-to-terminal communication, information from the base station from the first subframe.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a configuration table;
FIG. 9 illustrates an example of a configuration table.

DESCRIPTION OF EMBODIMENTS

While communication is being performed directly between communication terminal apparatuses, requests form a network side may not be handled.

When each communication terminal apparatus starts D2D wireless communication, the communication terminal apparatus establishes a D2D bearer, and concentrates on data communication between the communication terminal apparatuses. Therefore, for example, the communication terminal apparatus may not be able to receive incoming voice calls from the network side. A voice call may include voice over LTE (VoLTE).

Figure 1:
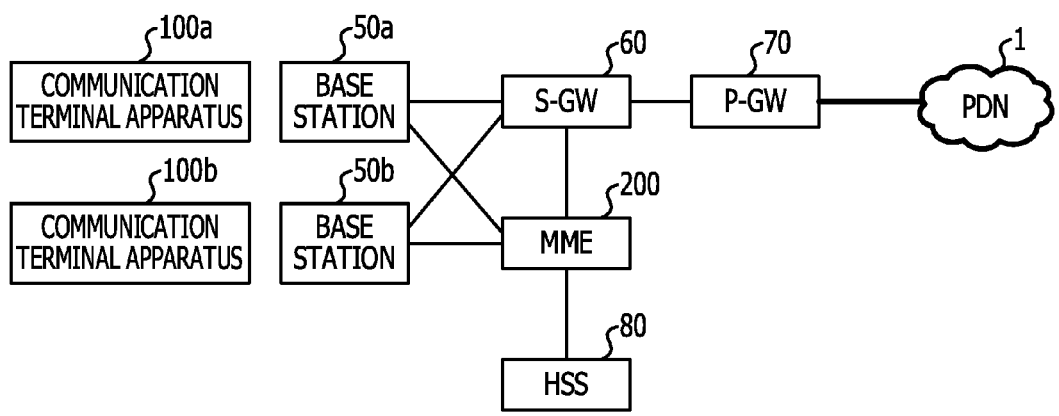
FIG. 1 illustrates an example of a communication control system.

FIG. 1 illustrates an example of a communication control system. The communication control system illustrated in FIG. 1 includes base stations (LTE base stations) 50a and 50b, a serving-gateway (S-GW) 60, and a packet data network gateway (P-GW) 70. The communication control system also includes a mobility management entity (MME) 200 and communication terminal apparatuses (user equipment (UE)) 100a and 100b. The P-GW 70 is coupled to a public data network (PDN) 1. The MME 200 is coupled to a home subscriber server (HSS) 80.

For example, the communication terminal apparatus 100a may perform data communication with the base station 50a, and the communication terminal apparatus 100b may perform data communication with the base station 50b. The D2D wireless communication, in which frames are directly transmitted and received, may be performed between the communication terminal apparatus 100a and the communication terminal apparatus 100b.

The base station 50a and the base station 50b may collectively be noted as base stations 50, where appropriate. The communication terminal apparatus 100a and the communication terminal apparatus 100b may collectively be noted as communication terminal apparatuses 100, where appropriate.

The base stations 50 may be apparatuses which perform wireless communication with the communication terminal apparatuses 100 by an LTE-Advanced system. The base stations 50 relay data communication between the communication terminal apparatuses 100 and the PDN 1. While the communication terminal apparatuses 100 are performing the D2D wireless communication, data communication may not be performed via the base stations 50.

The base stations 50 acquire from the MME 200 information of timings at which the communication terminal apparatuses 100 transmit and receive a frame by the D2D wireless communication and information of subframes whose usage rights are granted to the base stations 50 among a plurality of subframes included in the frame. When incoming voice calls to the communication terminal apparatuses 100 occur, the base stations 50 synchronize with the timings at which the frame is transmitted and received between the communication terminal apparatuses 100. The base stations 50 transmit incoming call information to the communication terminal apparatuses 100 to match with the timings at which the subframes whose usage rights are assigned to the base stations 50 arrive at the communication terminal apparatuses 100.

The S-GW 60 is coupled to the base stations 50, the MME 200, and the P-GW 70. For example, the S-GW 60 may have a packet routing function.

The P-GW 70 is coupled to the S-GW 60 and the PDN 1. The P-GW 70 may be a gateway which allows the communication control system to be coupled to the PDN 1. For example, the P-GW 70 may perform allocation of an IP address or the like.

The HSS 80 is coupled to the MME 200. The HSS 80 manages information of a subscriber who subscribes to a specific network.

The MME 200 is coupled to the base stations 50, the S-GW 60, and the HSS 80. The MME 200 performs security control or processing of setting a user data transfer path. The MME 200 exchanges control signals with the base stations 50 and the S-GW 60. The MME 200 includes an interface with the HSS 80, and manages users within the zone.

When the MME 200 receives requests for execution of the D2D wireless communication from the individual communication terminal apparatuses 100, the MME 200 reports information of timings at which the communication terminal apparatuses 100 transmit and receive a frame, and information of subframes whose usage rights are assigned to the base stations 50, among a plurality of subframes included in the frame, to the base stations 50 and the communication terminal apparatuses 100.

The communication terminal apparatuses 100 are coupled to the base stations 50 by the LTE-Advanced system, and are thus coupled to the PDN 1. The communication terminal apparatus 100a and the communication terminal apparatus 100b perform the D2D wireless communication, and directly exchange frames.

When a communication terminal apparatus 100 performs the D2D wireless communication, the communication terminal apparatus 100 assigns the usage right of a specific subframe, among a plurality of subframes included in a frame, to a base stations 50, based on information received from the MME 200. The communication terminal apparatus 100 acquires, from the specific subframe that is assigned to the base station 50, information from the base station 50. The communication terminal apparatus 100 uses other subframes to exchange data with a different communication terminal apparatus 100.

Figure 2:
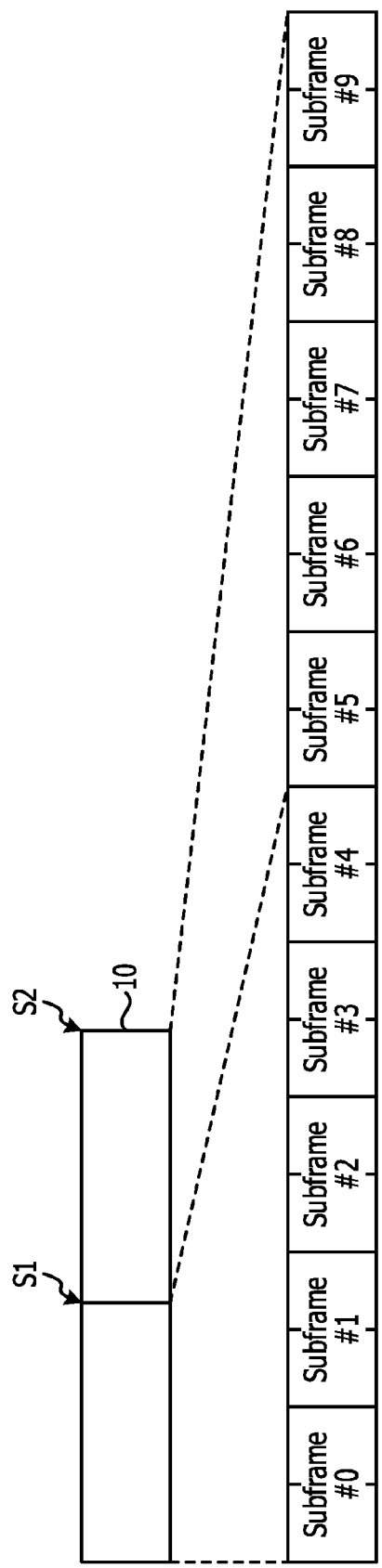
FIG. 2 illustrates an example of data of a frame.

FIG. 2 illustrates an example of data of a frame. The frame illustrated in FIG. 2 may be a frame which is transmitted and received directly between the communication terminal apparatus 100a and the communication terminal apparatus 100b. As illustrated in FIG. 2, a frame 10 includes subframes #0 to #9. For example, the frame length of the frame 10 may be 10 ms. A switching point is set in the frame 10.

The switching point represents a timing at which switching between downlink and uplink of a frame is performed. For example, as illustrated in FIG. 2, when a switching point "S1" is set between the subframe #4 and the subframe #5, the subframes #0 to #4 are used as downlink subframes, and the subframes #5 to #9 are used as uplink subframes. When a switching point "S2" is set at the end of the subframe #9, the use of the subframes #0 to #9 as downlink subframes and the use of the subframes #0 to #9 as uplink subframes are performed alternately.

Data stored in each of the subframes #0 to #9 illustrated in FIG. 2 may be defined by a D2D configuration table. FIG. 3 illustrates an example of a configuration table. As illustrated in FIG. 3, configuration numbers, switching point periods, and subframe numbers are associated with each other in the configuration table.

A configuration number is a number for uniquely identifying a combination of a switching point period and the usage rights of individual subframes. A switching point period is information for identifying the switching point. For example, when the frame length of the frame 10 illustrated in FIG. 2 is "10 ms" and the switching point period is "5 ms", the switching point may correspond to the switching point "S1" illustrated in FIG. 2. When the switching point period is "10 ms", the switching point may correspond to the switching point "S2" illustrated in FIG. 2.

In the configuration table, the combination of a subframe number and a symbol "D", "S", "U1", or "U2" defines information to be stored in each subframe. "D" indicates that the usage right of the subframe is assigned to a base station 50. "S" indicates that the subframe stores information of a switching point. "U1" indicates that the usage right of the subframe is assigned to the communication terminal apparatus 100a. "U2" indicates that usage right of the subframe is assigned to the communication terminal apparatus 100b.

For example, when the configuration number is "0", the switching point period is "5 ms". The base station 50 has the usage right of the subframe #0. The subframes #1 and #6 store information of switching points. The communication terminal apparatus 100a has the usage rights of the subframes #2 to #4 and #7 to #9. The communication terminal apparatus 100b has the usage right of the subframe #5.

Figure 4:
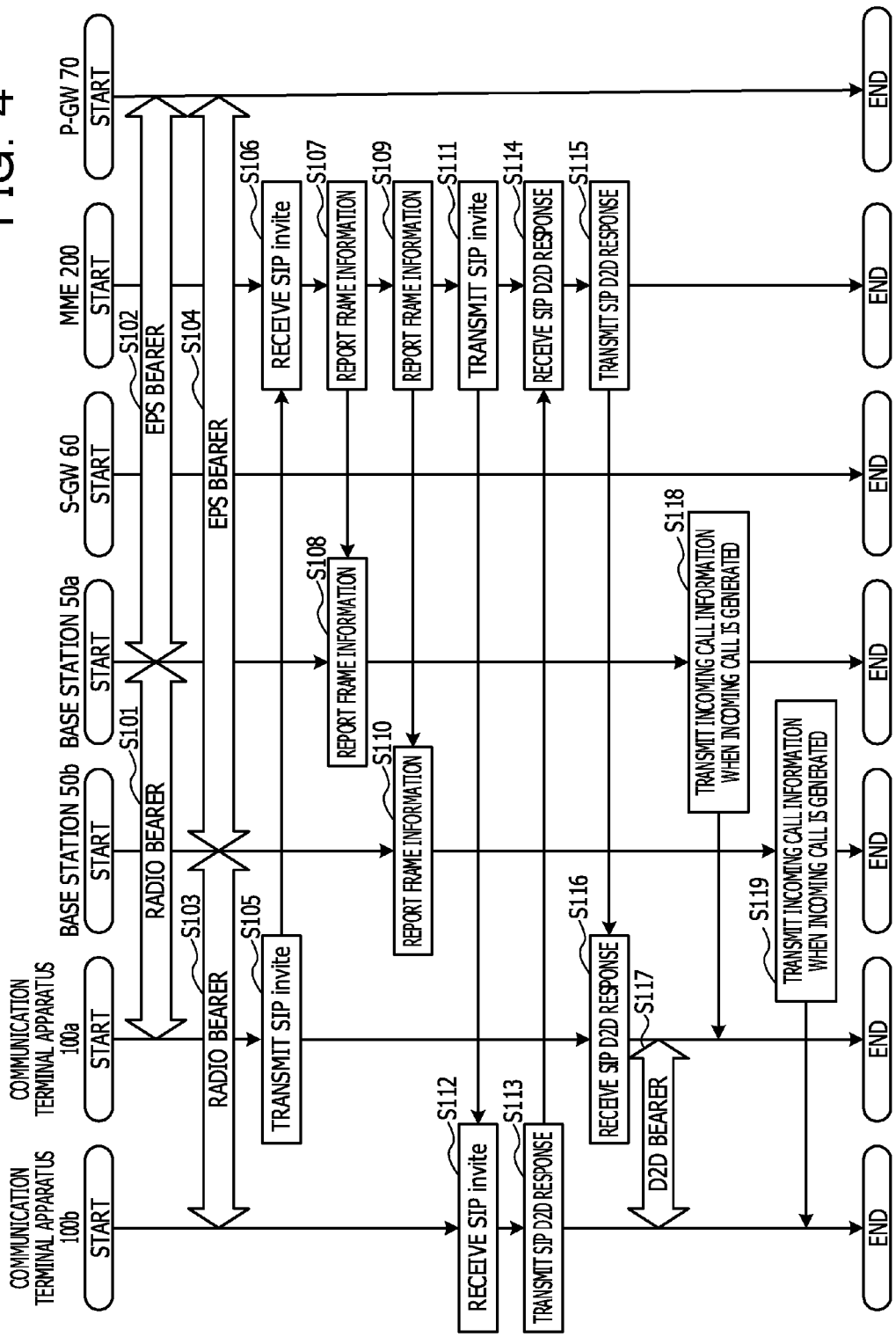
FIG. 4 illustrates an example of a processing procedure of a communication control system.

FIG. 4 illustrates an example of a processing procedure of a communication control system. As illustrated in FIG. 4, the communication terminal apparatus 100a and the base station 50a establish a radio bearer (operation S101). The base station 50a and the P-GW 70 establish an evolved packet system (EPS) bearer (operation S102). The communication terminal apparatus 100b and the base station 50b establish a radio bearer (operation S103). The base station 50b and the P-GW 70 establish an EPS bearer (operation S104).

When the communication terminal apparatus 100a wants to start D2D wireless communication with the communication terminal apparatus 100b, the communication terminal apparatus 100a transmits a session initiation protocol (SIP) invite to the MME 200 (operation S105). For example, the SIP invite may include frame information. The frame information may include a configuration number selected by the communication terminal apparatus 100a. Instead of the configuration number, the switching point period illustrated in FIG. 3 or information regarding the usage rights of the subframes #0 to #9 may be included in the frame information. The frame information may further include information of a reference time at which the communication terminal apparatus 100a and the communication terminal apparatus 100b transmit and receive the frame by the D2D wireless communication.

The MME 200 receives the SIP invite from the communication terminal apparatus 100a (operation S106). The MME 200 reports the frame information included in the SIP invite to the base station 50a (operation S107). The base station 50a receives the frame information (operation S108). The MME 200 reports the frame information included in the SIP invite to the base station 50b (operation S109). The base station 50b receives the frame information (operation S110).

The MME 200 transmits the SIP invite to the communication terminal apparatus 100b (operation S111). The communication terminal apparatus 100b receives the SIP invite (operation S112). The communication terminal apparatus 100b transmits a SIP D2D response to the MME 200 (operation S113), and the MME 200 receives the SIP D2D response (operation S114).

The MME 200 transmits the SIP D2D response to the communication terminal apparatus 100a (operation S115). The communication terminal apparatus 100a receives the SIP D2D response (operation S116). The communication terminal apparatus 100a and the communication terminal apparatus 100b establish a D2D bearer based on the frame information, and start D2D wireless communication (operation S117).

Based on the frame information, the base station 50a synchronizes with the communication terminal apparatus 100a. When an incoming call to the communication terminal apparatus 100a occurs, the base station 50a transmits incoming call information to the communication terminal apparatus 100a at the timing at which a subframe whose usage right is assigned to the base station 50a is received by the communication terminal apparatus 100a (operation S118).

Based on the frame information, the base station 50b synchronizes with the communication terminal apparatus 100b. When an incoming call to the communication terminal apparatus 100b occurs, the base station 50b transmits incoming call information to the communication terminal apparatus 100b at the timing at which a subframe whose usage right is assigned to the base station 50b is received by the communication terminal apparatus 100b (operation S119).

Figure 5:
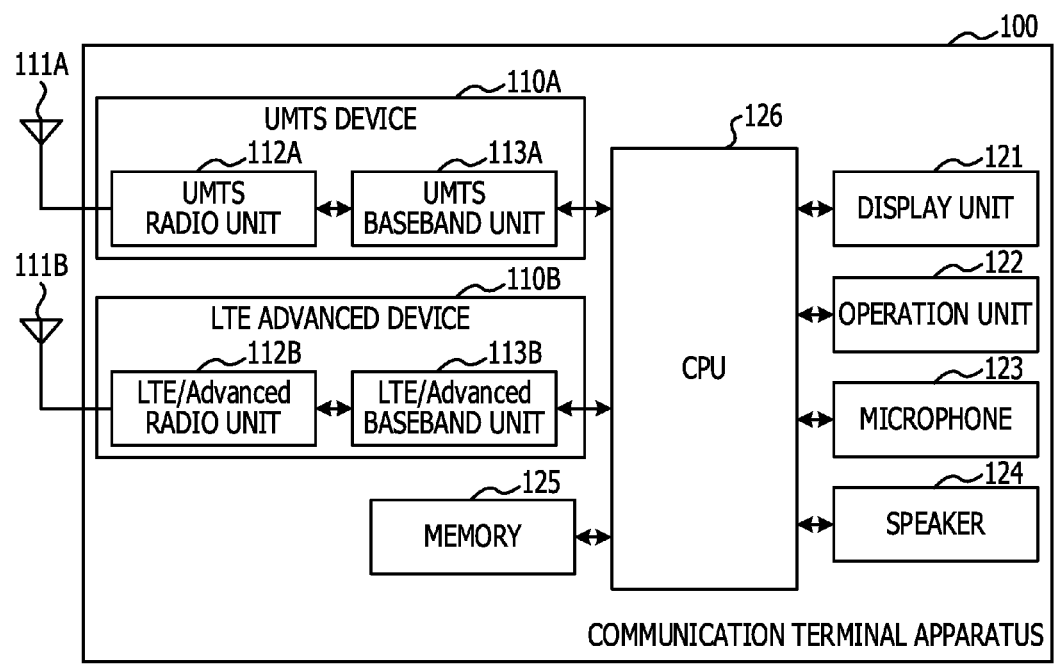
FIG. 5 illustrates an example of a communication terminal apparatus.

FIG. 5 illustrates an example of a communication terminal apparatus. The communication terminal apparatus illustrated in FIG. 5 may be the communication terminal apparatus 100 illustrated in FIG. 1. As illustrated in FIG. 5, the communication terminal apparatus 100 includes a universal mobile telecommunications system (UMTS) device 110A and an LTE Advanced device 110B. The communication terminal apparatus 100 also includes a display unit 121, an operation unit 122, a microphone 123, a speaker 124, a memory 125, and a central processing unit (CPU) 126. The communication terminal apparatus 100 may also include a wireless fidelity (WiFi) device.

The UMTS device 110A may be an interface that manages wireless communication between a UMTS circuit switching network and a UMTS packet network. The UMTS device 110A includes an antenna 111A, a UMTS radio unit 112A, and a UMTS baseband unit 113A. The UMTS radio unit 112A receives wireless signals of various data, such as audio and text data, in conformity to a UMTS system via the antenna 111A, and performs frequency conversion of the received wireless signals. The UMTS baseband unit 113A converts the wireless signals that have been subjected to frequency conversion at the UMTS radio unit 112A into baseband signals, and demodulates the converted baseband signals. The UMTS baseband unit 113A modulates transmission data into baseband signals. The UMTS radio unit 112A performs frequency conversion of the baseband signals that have been modulated at the UMTS baseband unit 113A, and transmits the transmission signals that have been subjected to frequency conversion via the antenna 111A.

The LTE Advanced device 110B may be an interface that manages wireless communication with the LTE network. The LTE Advanced device 110B includes an antenna 111B, an LTE Advanced wireless unit 112B, and an LTE Advanced baseband unit 113B. The LTE Advanced wireless unit 112B receives wireless signals of various data, such as audio and text data, in conformity to the LTE Advanced system via the antenna 111B, and performs frequency conversion of the received wireless signals. The LTE Advanced baseband unit 113B converts the wireless signals that have been subjected to frequency conversion at the LTE Advanced wireless unit 112B into baseband signals, and demodulates the converted baseband signals. The LTE Advanced baseband unit 113B modulates transmission data into baseband signals. The LTE Advanced wireless unit 112B performs frequency conversion of the baseband signals that have been modulated at the LTE Advanced baseband unit 113B, and transmits the transmission signals that have been subjected to frequency conversion via the antenna 111B.

The display unit 121 may be an output interface that displays various types of information on a screen. The operation unit 122 may be an input interface that inputs various types of information. The microphone 123 may be an input interface that collects various sounds. The speaker 124 may be an output interface that acoustically outputs various sounds. The memory 125 may be an area in which various types of information are stored. The CPU 126 may be a device that controls the entire communication terminal apparatus 100.

Figure 6:
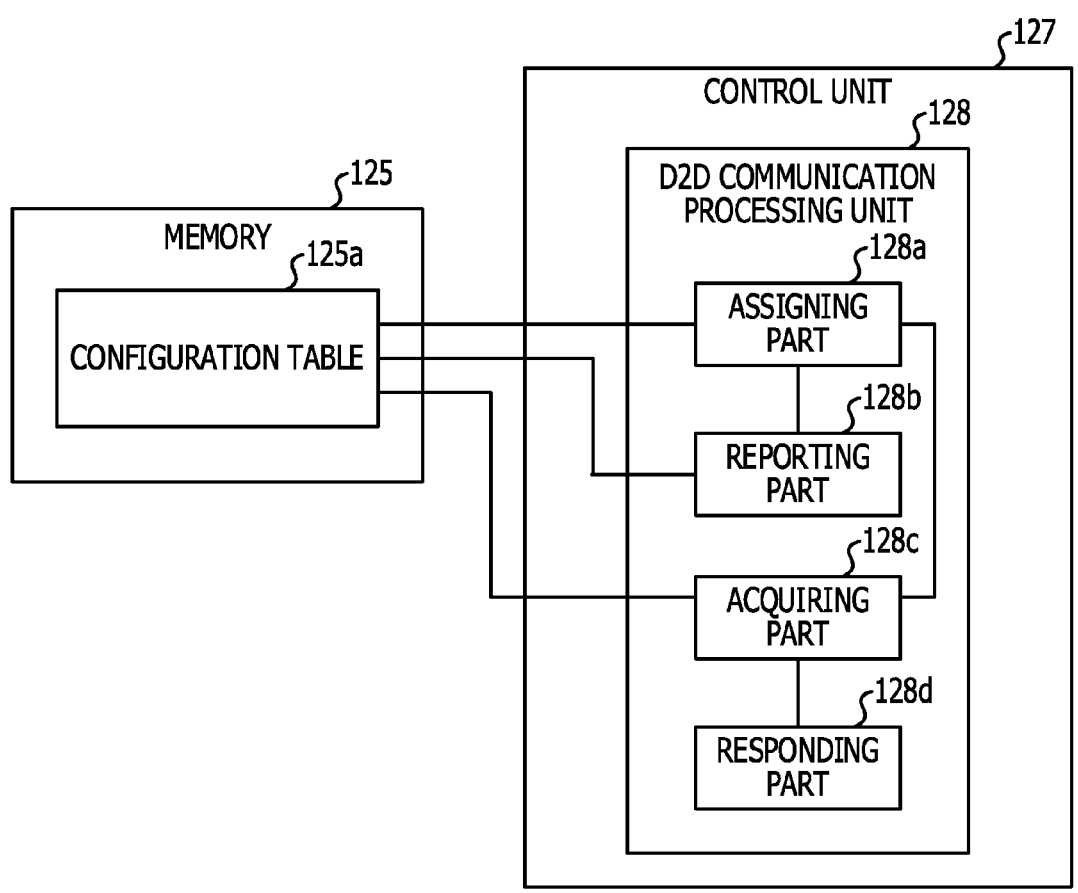
FIG. 6 illustrates an example of a controller.

Next, an example of the configuration of a controller included in the CPU 126 illustrated in FIG. 5 will be described. FIG. 6 illustrates an example of a controller. The controller illustrated in FIG. 6 may be the controller included in the CPU 126 illustrated in FIG. 5. A controller 127 illustrated in FIG. 6 includes a D2D communication processing unit 128. The memory 125 stores a configuration table 125a. The data structure of the configuration table 125a may correspond to the data structure illustrated in FIG. 3.

The D2D communication processing unit 128 may be a processing unit that establishes a D2D bearer with a different communication terminal apparatus 100, based on a certain frequency reported from the base station 50, and performs D2D wireless communication with the different communication terminal apparatus 100. The D2D communication processing unit 128 includes an assigning part 128a, a reporting part 128b, an acquiring part 128c, and a responding part 128d. The other processing features may be substantially the same as or similar to processing related to well-known D2D wireless communication and the explanation of those processing features may be omitted or reduced.

In the case where a communication terminal apparatus 100 is an apparatus which transmits a SIP invite, the assigning part 128a, the reporting part 128b, and the acquiring part 128c may perform the processing described below. The communication terminal apparatus 100 that transmits a SIP invite may be, for example, the communication terminal apparatus 100a illustrated in FIG. 4.

When performing D2D wireless communication with the different communication terminal apparatus 100, the assigning part 128a assigns usage rights of a plurality of subframes included in a frame. For example, by referring to the configuration table 125a, the assigning part 128a selects a configuration number. The assigning part 128a may select a configuration number in a random manner, may select a configuration number which is frequently used, or may select a configuration number specified in advance by an administrator. The assigning part 128a outputs the selected configuration number to the reporting part 128b and the acquiring part 128c.

For example, as illustrated in FIG. 3, when the assigning part 128a selects a configuration number "0", the usage right of the subframe #0 is assigned to a base station 50. Information of switching points is stored in the subframes #1 and #6. The usage rights of the subframes #2 to #4 and #7 to #9 are assigned to the communication terminal apparatus 100a.

The usage right of the subframe #5 is assigned to the communication terminal apparatus 100b. The switching period is "5 ms".

The reporting part 128b generates frame information based on the configuration number acquired from the assigning part 128a, stores the generated frame information in a SIP invite, and reports the SIP invite to the MME 200. The frame information reported by the reporting part 128b is reported to the base station 50 and the communication terminal apparatus 100b via the MME 200.

The reporting part 128b may store in frame information only a configuration number, or information of a record of the configuration table 125a corresponding to a configuration number.

During the D2D wireless communication, the acquiring part 128c acquires incoming call information from the base station 50, based on a specific subframe assigned by the assigning part 128a. The acquiring part 128c compares the configuration number acquired from the assigning part 128a with the configuration table 125a to identify a subframe whose usage right is assigned to the base station 50, and acquires from the identified subframe the incoming call information from the base station 50.

For example, in the case where the configuration number is "0", the subframe whose usage right is assigned to the base station 50 is the subframe #0. In this case, if incoming call information is included in the subframe #0, the acquiring part 128c may report the incoming information to a higher processing unit. The higher processing unit that receives the report, performs well-known incoming call processing. For example, the higher processing unit may display on the display unit 121 information indicating that there is an incoming call.

In the case where a communication terminal apparatus 100 is a communication terminal apparatus which receives a SIP invite, the acquiring part 128c or the responding part 128d may perform the processing described below. The communication terminal apparatus that receives a SIP invite may be, for example, the communication terminal apparatus 100b illustrated in FIG. 4.

When receiving a SIP invite, the responding part 128d acquires frame information included in the SIP invite, and outputs a configuration number included in the frame information to the acquiring part 128c. The responding part 128d transmits a SIP D2D response, which indicates that the SIP invite has been received, to the MME 200. The SIP D2D response is reported from the MME 200 to the communication terminal apparatus 100a.

During D2D wireless communication, the acquiring part 128c acquires incoming call information from the base station 50, based on the configuration number acquired from the responding part 128d. The acquiring part 128c compares the configuration number acquired from the responding part 128d with the configuration table 125a to identify a subframe whose usage right is assigned to the base station 50. The acquiring part 128c acquires from the identified subframe the incoming call information from the base station 50. The acquiring part 128c reports the incoming call information to a higher processing unit.

Figure 7:
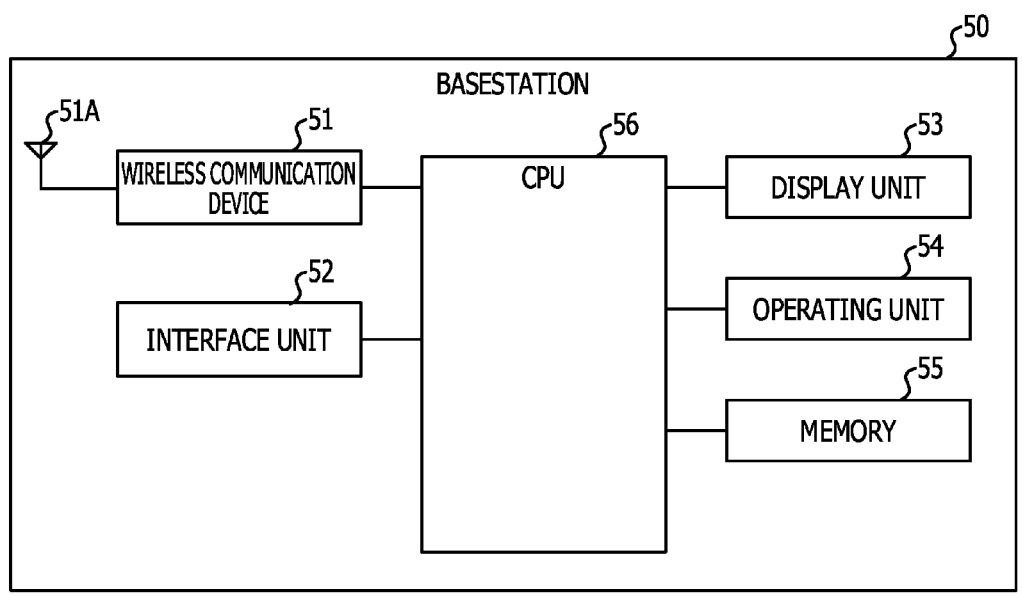
FIG. 7 illustrates an example of a base station.

FIG. 7 illustrates an example of a base station. The base station illustrated in FIG. 7 may be the base station 50 illustrated in FIG. 1. As illustrated in FIG. 7, the base station 50 includes a wireless communication device 51 and an interface 52. The base station 50 further includes a display unit 53, an operation unit 54, a memory 55, and a CPU 56. The other configuration features may be substantially the same as or similar to well-known base stations and the explanation of those configuration features may be omitted or reduced.

The wireless communication device 51 may be a device which is coupled to an antenna 51A and which performs wireless communication with a communication terminal apparatus 100. The wireless communication device 51 exchanges various data, such as audio and text data, in conformity to the LTE Advanced system via the antenna 51A.

The interface 52 may be an interface that exchanges data with the S-GW 60 or the MME 200. The display unit 53 may be an output interface that displays various types of information on a screen. The operation unit 54 may be an input interface that inputs various types of information. The memory 55 may be an area in which various types of information are stored.

The CPU 56 may be a device that controls the entire base station 50. For example, before D2D wireless communication is performed between communication terminal apparatuses, the CPU 56 establishes a radio bearer between the communication terminal apparatus 100 and the base station 50, and establishes an EPS bearer between the base station 50 and the P-GW 70.

The CPU 56 performs various types of processing based on frame information transmitted from the communication terminal apparatus 100. Based on the frame information, the CPU 56 synchronizes with the timing at which a frame is transmitted and received between wireless communication terminals. When an incoming call to the communication terminal apparatus 100 occurs, the CPU 56 transmits incoming call information to the communication terminal apparatus 100 to match with the timing at which a subframe whose usage right is assigned to the base station 50 arrives at the communication terminal apparatus.

For example, in the case where the configuration number included in the frame information is "0", the subframe whose usage right is assigned to the base station 50 is the "subframe #0". For example, in the case where an incoming call to the communication terminal apparatus 100a occurs, the CPU 56 transmits incoming call information in such a manner that the incoming call information arrives at the communication terminal apparatus 100a to match with the timing at which the communication terminal apparatus 100a, which is being performing the D2D wireless communication, receives the subframe #0 of the frame.

The base station 50 may store, in the memory 55, the configuration table 125a that is substantially the same as or similar to that in the communication terminal apparatus 100. In this case, the CPU 56 compares a configuration number included in the frame information with the configuration table 125a to identify a subframe whose usage right is assigned to the base station 50.

The CPU 56 shares the switching point period included in the frame information with the communication terminal apparatus 100. By using a reference time, based on which the communication terminal apparatuses 100 perform transmission and reception of a frame, the CPU 56 synchronizes with the timing at which the frame is transmitted and received between wireless communication terminals. Information of the reference time may be exchanged between the communication terminal apparatus 100 and the base station 50 in advance, the information of the reference time may be included in the frame information and reported from the communication terminal apparatus 100 to the base station 50, or the information of the reference time may be collectively controlled by the MME 200.

In the communication control system, in the case where the communication terminal apparatuses 100 perform terminal-to-terminal D2D wireless communication, the usage rights of specific subframes included in a frame exchanged between the terminals are assigned to the base stations 50 on the network side. Therefore, the communication terminal apparatuses 100 may be able to handle an incoming call request while performing the D2D wireless communication.

In the communication control system, information of a switching point of a frame which is transmitted and received via D2D wireless communication is reported to a base station 50. The base station 50 transmits incoming call information to match the timing at which the communication terminal apparatus 100 receives a subframe whose usage right is assigned to the base station 50.

The base station 50 may store the incoming information in the subframe assigned to the base station 50 and may report the incoming information to the communication terminal apparatus 100. For example, the base station 50 may store different information in the subframe, and therefore a problem, such as interference, occurring in the D2D wireless communication may be solved.

Figure 8:
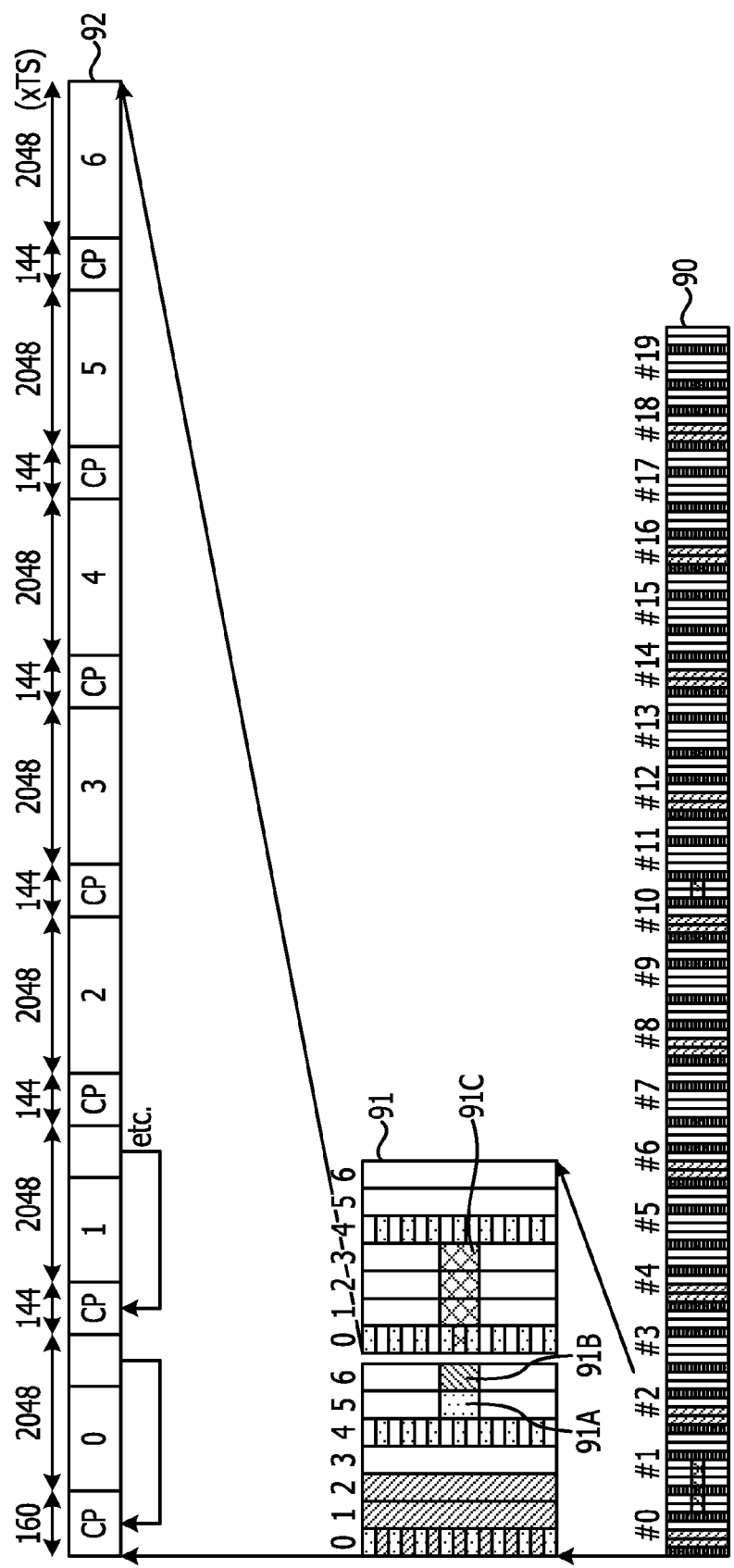
FIG. 8 illustrates an example of data of an LTE downlink physical channel.

FIG. 8 illustrates an example of data of an LTE downlink physical channel. The LTE downlink physical channel illustrated in FIG. 8 may be used when a communication terminal apparatus 100 performs wireless connection with a base station 50. As illustrated in FIG. 8, a frame 90 of an LTE downlink physical channel includes a plurality of subframes 91, and each of the subframes 91 includes a plurality of slots 92.

For example, the length of a frame may be 10 ms, and a frame may include ten subframes. The length of a subframe may be 1 ms, and a subframe may include two slots. The length of a slot may be 0.5 ms. The subframe 91 may include a Primary synchronization signal 91A and a Secondary synchronization signal 91B to achieve synchronization, or a PBCH signal 91C for carrying a broadcast control signal (BCCH).

The Primary synchronization signal 91A, the Secondary synchronization signal 91B, and the PBCH signal 91C overlap, in terms of time, with a transmission time of a subframe #0 of a frame transmitted and received via D2D wireless communication. Therefore, if a base station 50 transmits the frame 90 illustrated in FIG. 8 to a communication terminal apparatus 100 while the communication terminal apparatus 100 is performing D2D wireless communication, interference may occur to the subframe #0, thereby degrading data. Thus, the base station 50 may, for example, store information of the Primary synchronization signal 91A, the Secondary synchronization signal 91B, and the PBCH signal 91C in the subframe #0 and report the information to the communication terminal apparatus 100. With the processing described above, the problem of interference may be solved.

FIG. 9 illustrates an example of a configuration table. The configuration is not limited to the one illustrated in FIG. 3 and may be, for example, the one illustrated in FIG. 9. For example, in a record whose configuration number is "7" illustrated in FIG. 9, the usage rights of the subframes #0 and #5 are assigned to a base station 50. As described above, by assigning the usage rights of a plurality of subframes to the base station 50, options of the timing at which the base station 50 transmits incoming call information or the like and the amount of data may increase.

Figure 10:
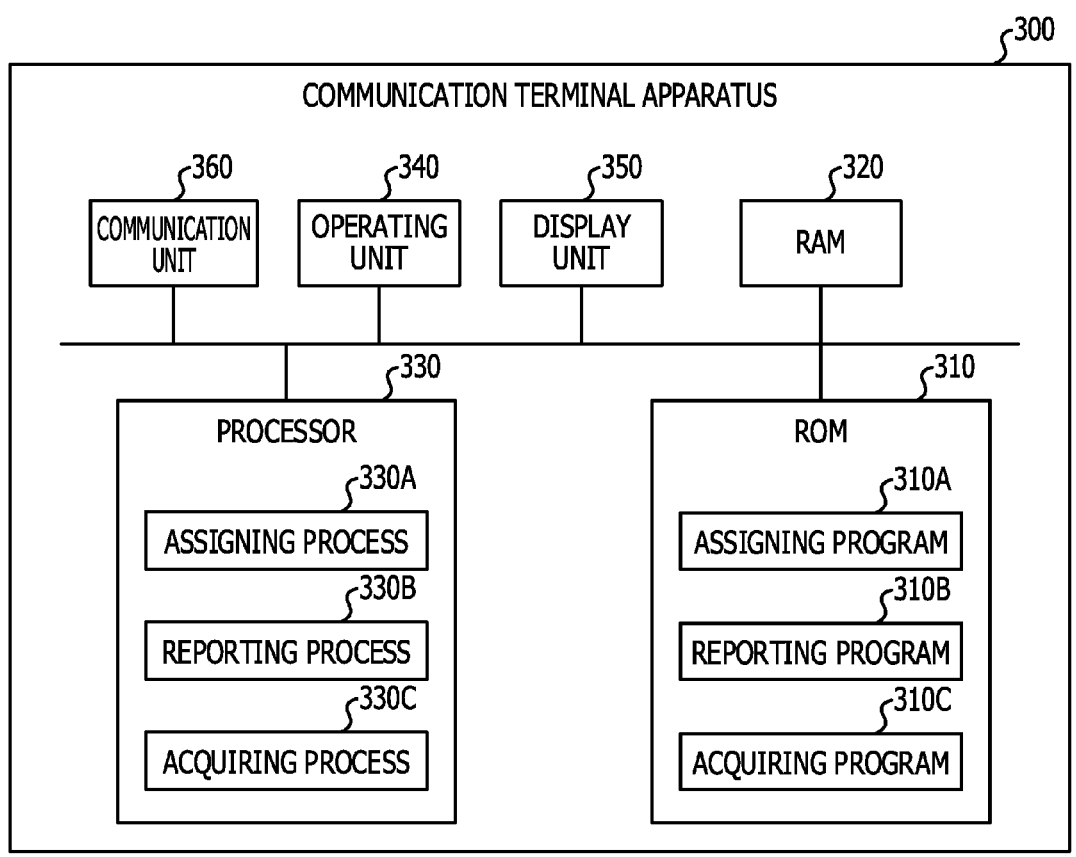
FIG. 10 illustrates an example of a communication terminal apparatus.

The various type of processing described above may be performed when a program is executed by a communication terminal apparatus. FIG. 10 illustrates an example of a communication terminal apparatus. The communication terminal apparatus illustrated in FIG. 10 may execute a program having a function that is substantially the same as or similar to that in the processing described above.

A communication terminal apparatus 300 illustrated in FIG. 10 which executes a communication control program includes a read-only memory (ROM) 310, a random-access memory (RAM) 320, a processor 330, an operation unit 340, a display unit 350, and a communication unit 360. A communication control program having a function which is substantially the same as or similar to that in the processing described above may be stored in advance in the ROM 310. A control program may be recorded in a recording medium which is readable by a drive, instead of the ROM 310. As a recording medium, for example, a portable recording medium, such as a compact-disc read-only memory (CD-ROM), a digital versatile disc (DVD), a universal serial bus (USB) memory, or an SD card, a semiconductor memory, such as a flash memory, or the like may be used. The control program may include an assigning program 310A, a reporting program 310B, or an acquiring program 310C, as illustrated in FIG. 10. The programs 310A, 310B, and 310C may be integrated together or distributed in an appropriate manner.

The processor 330 reads the programs 310A to 310C from the ROM 310 and executes the read programs. The processor 330 causes the programs 310A, 310B, and 310C to function as an assigning process 330A, a reporting process 330B, and an acquiring process 330C, respectively. For example, the assigning process 330A may correspond to the assigning part 128*a* illustrated in FIG. 6. The reporting process 330B may correspond to the reporting part 128*b* illustrated in FIG. 6. The acquiring process 330C may correspond to the acquiring part 128*c* illustrated in FIG. 6.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication terminal apparatus comprising:
    a memory configured to store a control program, and
    a processor configured to execute a control program and in response to executing the control program causes the communication terminal apparatus to perform operations, the operations comprising:
        assigning a usage right of a first subframe, from among a plurality of subframes included in a frame, to a base station, in a case where terminal-to-terminal communication is performed by transmission and reception of the frame directly with a different communication terminal apparatus of a plurality of communication terminal apparatuses, based on frequency information reported from the base station and by selecting a configuration number from among a plurality of configuration numbers each indicating combinations which include a first combination between a third subframe of the plurality of subframes and a corresponding communication terminal apparatus of the plurality of communication terminal apparatuses which is allowed to use the third subframe, a second combination between a fourth subframe of the plurality of subframes and the base station which is allowed to use the fourth subframe, and a third combination between a fifth subframe of the plurality of subframes and information of a switching point; and acquiring, during the terminal-to-terminal communication, information which the base station transmits in accordance with a timing when the communication terminal apparatus receives the first subframe corresponding to the fourth subframe specified by a selected configuration number using the information of the switching point specified by the selected configuration number.

2. The communication terminal apparatus according to claim 1, wherein the operations further comprise selecting, as the first subframe, an initial subframe from among the plurality of subframes.

3. The communication terminal apparatus according to claim 1, wherein the operations further comprise selecting, as the first subframe, two or more subframes from among the plurality of subframes.

4. The communication terminal apparatus according to claim 1, wherein the operations further comprise notifying the base station of the first subframe by transmitting the configuration number.

5. The communication terminal apparatus according to claim 1, wherein the plurality of configuration numbers and the corresponding combinations are stored in a table in association with each other.

6. A communication control system that performs communication between a base station, a first communication terminal apparatus and a second communication terminal apparatus included in a plurality of communication terminal apparatuses, wherein the first communication terminal apparatus includes:
a memory configured to store a control program, and
a processor configured to execute the control program and in response to executing the control program causes the communication terminal apparatus to perform operations, the operations comprising:
assigning a usage right of a first subframe from among a plurality of subframes included in a frame, to the base station, in a case where terminal-to-terminal communication is performed by transmission and reception of the frame directly with the second communication terminal apparatus, based on frequency information reported from the base station and by selecting a configuration number from among a plurality of configuration numbers each indicating combinations which include a first combination between a third subframe of the plurality of subframes and a corresponding communication terminal apparatus of the plurality of which is allowed to use the third subframe, a second combination between a fourth subframe of the plurality of subframes and the base station which is allowed to use the fourth subframe, and a third combination between a fifth subframe of the plurality of subframes and information of a switching point;
reporting, to the base station, a first information of the first subframe and a second information of a timing of transmission and reception of the frame transmitted and received between the first communication terminal apparatus and the second communication terminal apparatus; and
acquiring, during the terminal-to-terminal communication, a third information which the base station transmits in accordance with a timing when the communication terminal apparatus receives the first subframe corresponding to the fourth subframe specified by a selected configuration number using the information of the switching point specified by the selected configuration number.

7. The communication control system according to claim 6, wherein the base station includes a controller that synchronizes with the timing of the transmission and reception of the frame, based on the first information and the second information, and transmits the third information to the first communication terminal apparatus to match with a timing at which the first subframe arrives at the first communication terminal apparatus.

8. The communication control system according to claim 6, wherein the operations further comprise, reporting to the base station fourth information of the switching point representing a timing at which switching between uplink and downlink of the frame is performed, and makes a synchronization among the first communication terminal apparatus, the second communication terminal apparatus, and the base station.

9. The communication control system according to claim 6, wherein the first information and the second information are reported to the base station via a management unit included in the communication control system.

10. The communication control system according to claim 6, wherein the operations further comprise notifying the base station of the first information by transmitting the configuration number.

11. The communication control system according to claim 6, wherein the plurality of configuration numbers and the corresponding combinations are stored in a table in association with each other.

12. A communication control method, the communication control method comprising:
assigning, by a computer, a usage right of a first subframe, from among a plurality of subframes included in a frame, to a base station, in a case where terminal-to-terminal communication is performed by transmission and reception of the frame directly with a different communication terminal apparatus of a plurality of communication terminal apparatuses, based on frequency information reported from the base station and by selecting a configuration number from among a plurality of configuration numbers each indicating combinations which include a first combination between a third subframe of the plurality of subframes and a corresponding communication terminal apparatus of the plurality of communication terminal apparatuses which is allowed to use the third subframe, a second combination between a fourth subframe of the plurality of subframes and the base station which is allowed to use the fourth subframe, and a third combination between a fifth subframe of the plurality of subframes and information of a switching point; and
acquiring, during the terminal-to-terminal communication, information which the base station transmits in accordance with a timing when the communication terminal apparatus receives the first subframe corresponding to the fourth subframe specified by a selected configuration number using the information of the switching point specified by the selected configuration number.

13. The communication control method according to claim 12, wherein an initial subframe of the plurality of subframes is selected as the first subframe.

14. The communication control method according to claim 12, wherein two or more subframes are selected as the first subframe.

15. The communication control method according to claim 12, further comprising notifying the base station of the first subframe by transmitting the configuration number.

16. The communication control method according to claim 12, wherein the plurality of configuration numbers and the corresponding combinations are stored in a table in association with each other.

* * * * *